July 16, 1963 J. H. GILSON ETAL 3,097,883
CONVERTIBLE TOP
Filed May 23, 1960 5 Sheets-Sheet 1
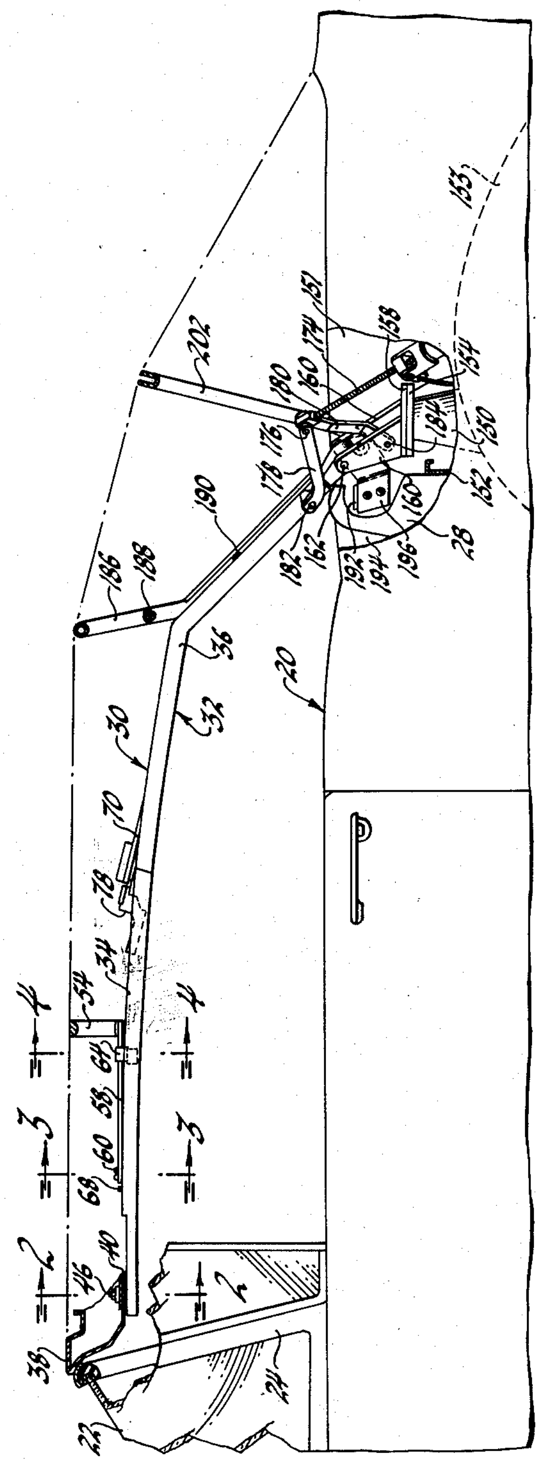
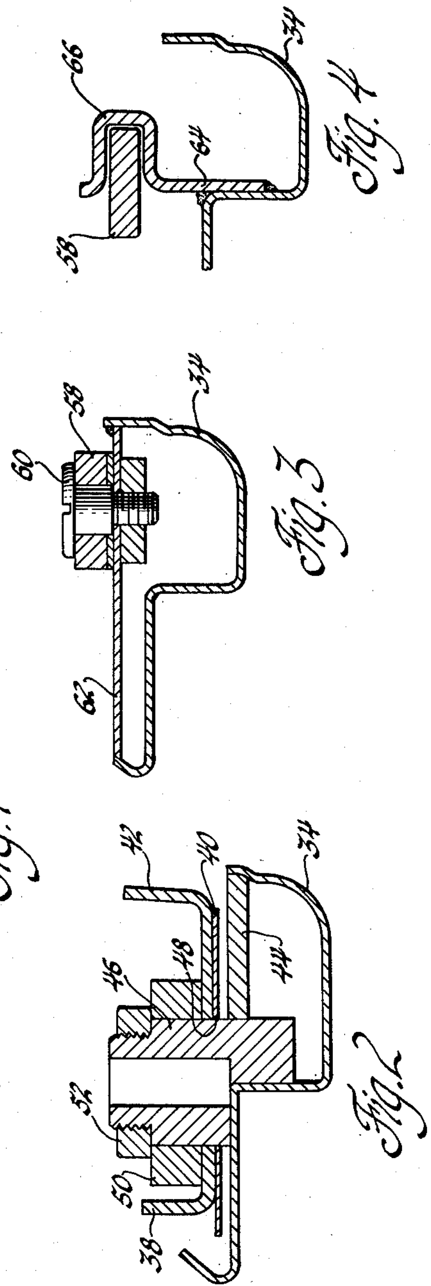
INVENTORS
Joseph H. Gilson &
BY Edward G. Podolan
Herbert Furman
ATTORNEY July 16, 1963 J. H. GILSON ETAL 3,097,883
CONVERTIBLE TOP
Filed May 23, 1960 5 Sheets-Sheet 2
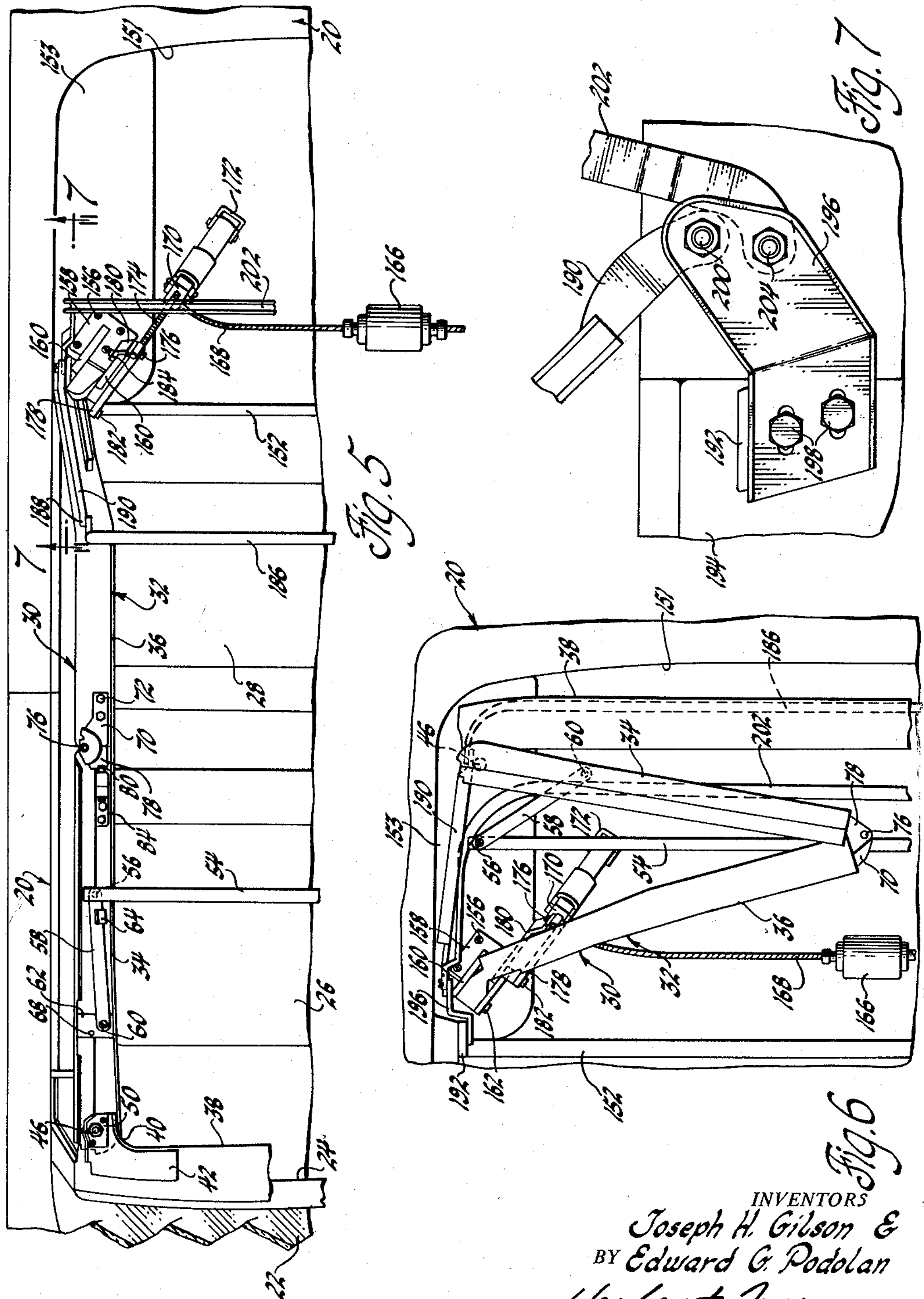
INVENTORS
Joseph H. Gilson &
BY Edward G. Podolan
Herbert Furman
ATTORNEY July 16, 1963 J. H. GILSON ETAL 3,097,883

CONVERTIBLE TOP

Filed May 23, 1960 5 Sheets-Sheet 3

INVENTORS
Joseph H Gilson &
BY Edward G. Podolan
Herbert Furman
ATTORNEY

July 16, 1963 J. H. GILSON ETAL 3,097,883

CONVERTIBLE TOP

Filed May 23, 1960 5 Sheets-Sheet 4

INVENTORS
Joseph H. Gilson &
BY Edward G. Podolan
Herbert Furman
ATTORNEY

CONVERTIBLE TOP

Filed May 23, 1960

INVENTORS
Joseph H. Gilson &
BY Edward G. Podolan
Herbert Furman
ATTORNEY

United States Patent Office 3,097,883 Patented July 16, 1963

3,097,883

CONVERTIBLE TOP

Joseph H. Gilson, Warren, and Edward G. Podolan, St. Clair Shores, Mich., assignors to General Motors Corporation, Detroit, Mich., a corporation of Delaware Filed May 23, 1960, Ser. No. 30,960
8 Claims. (Cl. 296—137)

This invention relates to convertible tops and more particularly to convertible tops of the general type having inwardly folding side rails.

The usual convertible top has a pair of side rails which include a plurality of pivotally interconnected rail sections foldable generally longitudinally of the body when the top is moved between raised and lowered positions. The folding movement of the rails is controlled by linkage systems, with the rear rail sections and portions of the linkage systems being mounted on the body in the rear quarter area thereof generally opposite the sides of the rear seat. Accordingly, a top well portion must be provided to each side of the rear seat, and these top well portions decrease the amount of passenger room available whereby the rear seats of convertible automobiles are of a smaller width than corresponding seats in other types of automobiles having closed bodies.

The convertible top of this invention eliminates many of the disadvantages of present convertible tops by having the side rails of the top fold inboard of the body and by further locating all of the actuating mechanism for the top rearwardly of the rear seat whereby a full width rear seat can be provided in the automobile. By having the side rails fold inboard of the body, there is no need for any linkage systems to fold and unfold the rail sections nor is there any need for locating any portion of the top at the sides of the rear seat. Further, the top of this invention includes means controlling the folding movement of the rail sections of each rail with respect to each other to ensure that the rails fold inboard synchronously and in unison with each other. Thus, the top folds evenly and smoothly when moving between raised and lowered positions.

The primary object of this invention is to provide a new and improved convertible top structure of the general type having inwardly folding side rails. Another object of this invention is to provide a new and improved convertible top having inwardly folding side rails, with the rear rail sections being mounted on the body rearwardly of the rear seat of the automobile to increase the rear seat passenger space. Yet another object of this invention is to provide a convertible top of the type having inwardly folding side rails, each of which is supported on the body for swinging movement about a horizontal axis which extends forwardly and inwardly of the body. Yet another object of this invention is to provide a new and improved convertible top of the general type having a pair of spaced inwardly folding side rails, with means being provided at the pivots of the rail sections of each rail to ensure synchronous folding movement of the rails with respect to each other.

These and other objects of this invention will be readily apparent from the following specification and drawings wherein:

FIGURE 1 is a partially broken away, partial side elevational view of a convertible vehicle body embodying a convertible top according to this invention, with the top being shown in raised position;

FIGURE 2 is an enlarged sectional view taken generally along the plane indicated by line 2—2 of FIGURE 1;

FIGURE 3 is an enlarged sectional view taken generally along the plane indicated by line 3—3 of FIGURE 1;

FIGURE 4 is an enlarged sectional view taken generally along the plane indicated by line 4—4 of FIGURE 1;

FIGURE 5 is a partial top plan view of the vehicle body shown in FIGURE 1;

FIGURE 6 is a partial top plan view showing the convertible top in a lowered position;

FIGURE 7 is an enlarged view taken generally along the plane indicated by line 7—7 of FIGURE 5;

Figures 8, 9, 10:
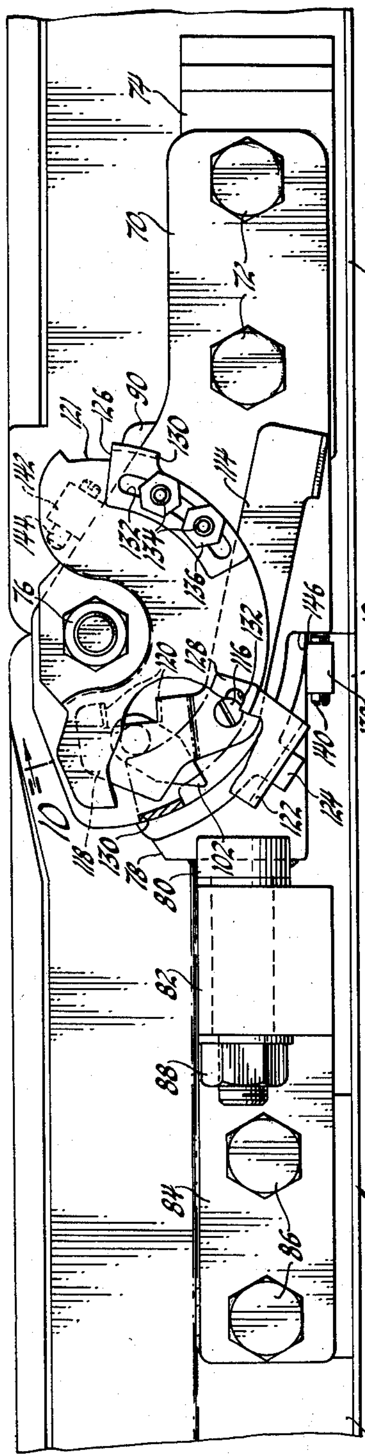
FIGURE 8 is an enlarged view of a portion of FIGURE 5 showing the means controlling the folding movement of the rail sections of each rail with respect to each other.
FIGURE 9 is an enlarged broken away view of a portion of FIGURE 8.
FIGURE 10 is an enlarged sectional view taken generally along the plane indicated by line 10—10 of FIGURE 8.

Referring now particularly to FIGURES 1, 5, 6, and 11 of the drawings, a convertible vehicle body 20 includes a windshield 22 and a windshield header 24. The passenger compartment of the body includes a vehicle front seat 26 and a vehicle rear seat 28. A convertible top 30, according to this invention, is mounted on the body 20 for movement between a raised position, as shown in FIGURES 1 and 5, and a lowered position, as shown in FIGURE 6, in order to open and close the passenger compartment of the body.

The top 30 generally includes a spaced pair of inwardly folding side rails 32, each of which includes a front rail section 34 and a rear rail section 36, with the rear rail section being supported on the body. Since the rails 32 are of like construction, although of different hand, only one such rail will be described, and it will be understood that the other is of the same construction.

The front rail sections 34 are each pivotally connected to one end of a convertible top header 38 which spans the body and is adapted to bear against the windshield header 24 in the raised position of the top, as shown. As best shown in FIGURES 1, 2 and 5 of the drawings, the lower wall of header 38 includes rearwardly extending end portions 40 which are reinforced by channel shaped bracket members 42 welded thereto. A bracket member 44 is welded to rail section 34 adjacent the forward end thereof and fixedly supports a bearing stud 46. Stud 46 is rotatably received within apertures 48 in end portion 40 and member 42. A bearing plate 50 is secured to bracket 42 and rotatably received on stud 46. A nut 52 threaded on the threaded upper end of the bearing stud locates end portion 40, bracket 42 and bearing plate 50 on the bearing stud 46 to rotatably interconnect header 38 and the forward ends of rail sections 34.

A front or No. 1 bow 54 of rigid construction has its ends pivoted at 56 to the rearward ends of links 58. The forward ends of links 58 are pivoted at 60 to brackets 62 welded to the front rail sections 34. In order to locate links 58 and bow 54 laterally of rail 32 in the raised position of the top, a pair of brackets 64 are welded to the rail sections 34, with each bracket being provided with an offset pocket 66 receiving a respective link 58 in the raised position of the top. When the front rail sections 34 swing inwardly about the bearing studs 46 as the top is being lowered, the links 58 swing outwardly of the rail sections 34 about their pivots 60 to allow the bow 54 to move with the top and to be folded relative to the rail sections 34. Stop pins 68 secured to brackets 62 are engaged by links 58 in the fully lowered position of the top to locate the links and bow 54.

It will be remembered that the convertible top of this invention includes means for controlling the folding movement of the rail sections 34 and 36 of each rail with respect to each other to ensure that the spaced rails 32 fold inboard of the body synchronously and in unison with each other. This controlling means will now be described with particular reference to FIGURES 8 thru 10 of the drawings. A mounting arm 70 is bolted at 72 to a bracket 74 secured to the rear rail section 36. A bearing stud 76 connects arm 70 to a mounting arm 78 which is secured to the front rail section 34, as will be described, whereby the arms 70 and 78 pivotally interconnect the rail sections 34 and 36. Arm 78 is secured to a bearing stud 80 which is journaled within an apertured lug 82 of a mounting bracket 84. Bracket 84 is bolted at 86 to the front rail section 34, and a nut 88 threaded on the threaded end of the bearing stud 80 interconnects the mounting arm 78 and the bracket 84.

The bearing stud 76 defines the vertical axis of swinging movement of the rail sections 34 and 36 with respect to each other, with the axis of the stud lying in a vertical plane transverse of the body and inclined rearwardly and upwardly of the body at an angle of approximately 85° to the horizontal in the raised position of the top. The bearing stud 80 defines the horizontal axis of swinging movement of rail sections 34 and 36 with respect to each other with the axis of this stud lying in a vertical plane transverse of the body and inclined forwardly and upwardly of the body at an angle of approximately 15° to the horizontal. The axes of studs 76 and 80 are not inclined transverse of the body but lie in vertical planes longitudinally of the body which are parallel to the longitudinal vertical plane of the center line of the body. Thus, the rail sections 34 and 36 can pivot about both horizontal and vertical axes with respect to each other during raising and lowering movement of the top. In certain installations, the use of the bearing stud 80 may not be required since it may not be necessary that the rail sections 34 and 36 pivot about a horizontal axis with respect to each other during raising and lowering movement of the top.

A ratchet 90 is riveted at a number of places at 92 to the mounting arm 78, with the teeth of the ratchet facing the bearing stud 76. A pawl 94 has opposite toothed ends 96 and 98 which are adapted to selectively and alternately move along the teeth of the ratchet 90 in order to allow one way movement of the rail sections 34 and 36 relative to each other, as will be further described. As best shown in FIGURE 10, pawl 94 includes an integral bearing shaft 100 which is journaled within an aperture in the mounting arm 70. A pawl lever 102 is staked to the free end of shaft 100 to the upper side of the mounting arm 70 whereby the lever 102 and the pawl 94 are rotatable as a unit. A bowed leaf spring 104 has its opposite ends coiled around studs 106 which are staked to the mounting arm 70 and extend downwardly therefrom. Spring 104 has an intermediate shoulder 110 which is adapted to selectively and alternately engage opposite sides of a shoulder 112 of pawl 94 in order to locate the pawl in either of its two positions whereby either the toothed end 96 or the toothed end 98 of the pawl will be resiliently held in a position so as to engage the teeth of the ratchet 90 and provide for one way folding movement of the rail sections 34 and 36 relative to each other.

As will be further explained, the pawl 94 is automatically reversed at the end of each cycle of folding movement of the rails 34 and 36. However, in order to provide for reversal of the pawl whenever desired, a manual reversing lever 114 is provided. Lever 114 is rotatably mounted at 116, FIGURE 10, on mounting arm 70 and includes an offset end 118 provided with a pair of depending lanced out tabs 120 which define a throat. As can be seen in FIGURE 8, if lever 114 is moved outwardly of the rail sections, or counterclockwise about pivot 116 as viewed in this figure, the offset end 118 of the lever will move inwardly of the rails so that the inner tab 120 will engage the inner side of the lever 102 to rotate this lever and move pawl 94 to its other position to move the toothed end 98 of the pawl into engagement with ratchet 90 and reverse the action of the ratchet and pawl as shoulder 112 cams past shoulder 110 whereby shoulder 110 will now engage the outer side of the shoulder 112.

A cover plate 121 is mounted on the bearing stud 76 and is held against rotation by having a slotted offset ear 122 of the cover plate receive a lug 124 of the ratchet 90. The cover plate adjustably mounts a pair of stops 126 and 128 of like construction which provides the automatic reversing means for pawl 94. Each stop includes a depending ear 130 which is located so as to engage the free end of lever 102, with the stops being adjustable with respect to plate 121 by providing an arcuate closed slot 132 in each stop which receives a pair of bolts 134 secured to the cover plate. Nuts 136 threaded on the bolts 134 hold the stops in whatever adjusted position desired.

In order to positively locate the rail sections 34 and 36 with respect to each other in both the raised and lowered positions of the top, the mounting arm 78 is provided with an internally threaded lug 138 which adjustably mounts a set screw 140, and the mounting arm 70 is provided with a like lug 142 which adjustably mounts a set screw 144. When the top is in a raised position, set screw 140 engages a shoulder 146 of mounting arm 70 to prevent further inboard swinging movement of the rail sections 34 and 36 with respect to each other, and locate the rail sections in extended position, and when the top is in a lowered position, set screw 144 engages an edge 148 of mounting arm 78 to prevent further outboard swinging movement of the rail sections with respect to each other and locate the rail sections in folded position.

Figure 11:
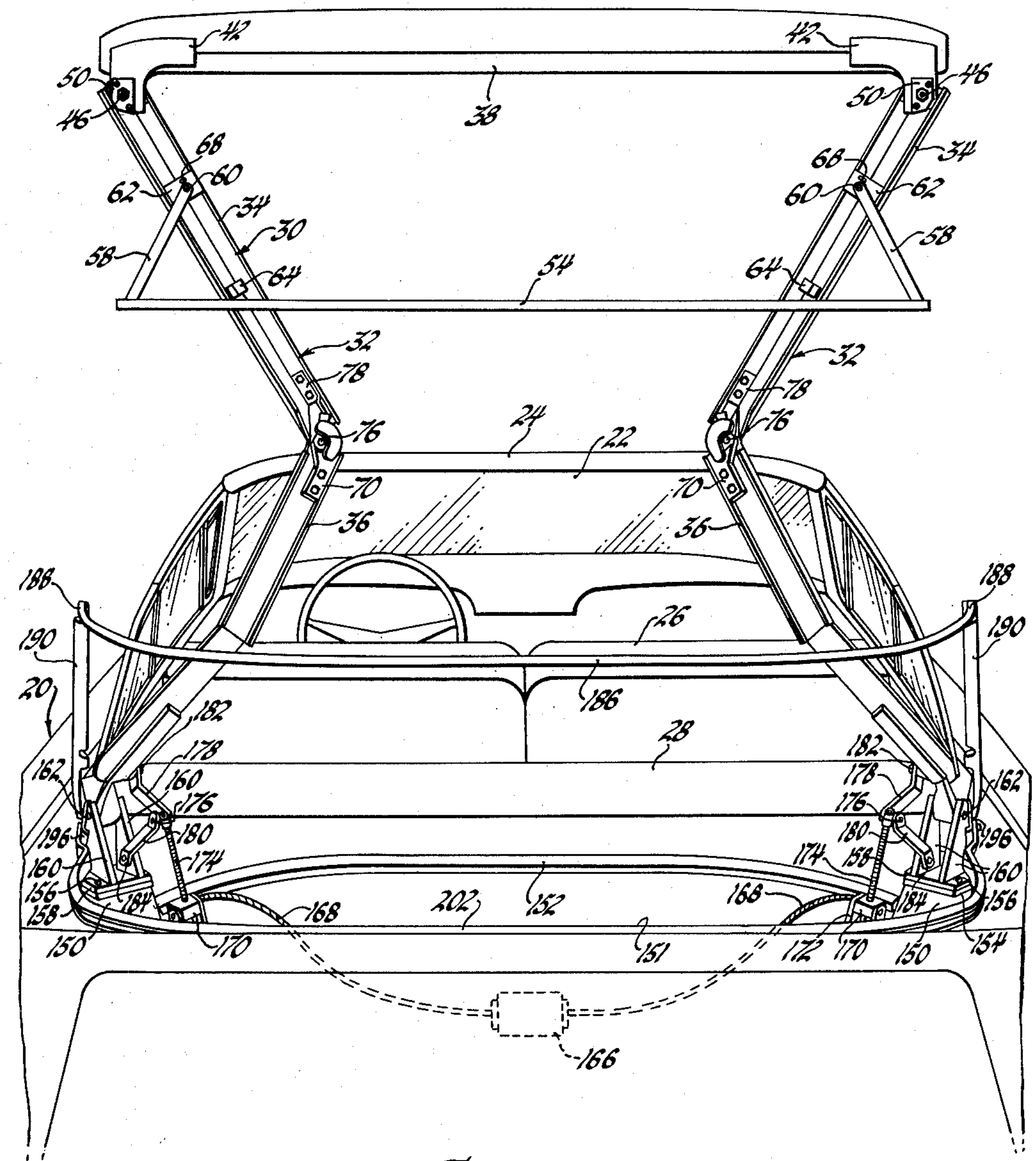
FIGURE 11 is a rear perspective view of the vehicle body of FIGURE 1 and showing the convertible top in a partially lowered position intermediate the positions of FIGURES 1 and 6.

Referring now particularly to FIGURES 1, 5, and 11 of the drawings, the manner in which the rear rail sections 36 are mounted on the body will be described. A mounting support 150 is mounted within the top well 151 of the body rearwardly of the rear seat 28 and immediately rearwardly of a body partition 152. Preferably, the support 150 is welded or otherwise rigidly secured to the inner rear wheel housing 153 of the body. Support 150 includes an upper plate 154 bolted at 156 to the lower plate 158 of a trunnion bracket which includes a spaced pair of upstanding ears 160 pivotally secured at 162 to the rear rail sections 36. Pivots 162 are defined by bearing studs fixed to the ears 160 and rotatively received within bearing apertures in the rearward ends of the rail sections 36. The axes defined by the pivots 162 lie in a horizontal plane, with each axis extending generally forwardly and inwardly of the body in this horizontal plane whereby the axes converge with respect to each other. Each axis lies in a vertical plane located approximately 45° with respect to the vertical plane of the center line of the body.

The rear rail sections 36 are power operated in order to move the top between raised and lowered positions. As shown in FIGURES 5, 6, and 11, an electric motor 166 mounted on the body rearwardly of the partition 152 drives a pair of flexible cables 168. Each cable 168 drives a gear drive unit 170 which is supported by an upwardly extending bracket 172 fixedly mounted on the body. The gear drive unit 170 is of known type and reference may be had to Patent Number 2,905,012 Lohr et al. for the details of a suitable unit. A screw shaft 174 is threadedly received through each of the drive units 170, with the upper end of the screw shaft being pivoted at 176 to one end of links 178 and 180. Link 178 is pivoted at its other end at 182 to the rail section 36 and link 180 is pivoted at its other end at 184 to the inboard ear 160. Upon operation of the motor 166, the drive unit 170 will rotate so as to thread the shaft 174 inwardly and outwardly thereof to thereby fold and unfold links 178 and 180 and swing the rail sections 36 about the bearing studs 162.

In the usual convertible top, the intermediate or No. 2 bow is supported by the side rails of the top and the rear or No. 3 bow is supported on the body. The arrangement of the intermediate and rear bows of the top of this invention differs from the usual type of construction inasmuch as the top of this invention includes inwardly folding side rails. The mounting of the intermediate and rear bows will now be described with particular reference to FIGURES 1, 5, 7 and 11 of the drawings.

The intermediate or No. 2 bow 186 is of rigid one-piece construction and has its ends pivoted at 188 to bow supports 190 which rest on rail sections 36 in the raised position of the top. As shown in FIGURE 7 of the drawings, a tapped mounting plate 192 is mounted on the rear quarter inner panel 194 of the body slightly forwardly of each of the supports 150. An offset bracket 196 is adjustably bolted at 198 to the plate 192. The bow supports 190 are pivoted at 200 to the bracket 196 for swinging movement in parallel longitudinal vertical planes with respect to the body. Further, the rear or No. 3 bow 202 has its ends pivoted at 204 to bracket 196 for likewise swinging movement in parallel longitudinal vertical planes wtih respect to the body.

The movement of the convertible top between a raised position, as shown in FIGURES 1 and 5, to a lowered position, as shown in FIGURE 6, will now be described. However, the operation of the means controlling the folding movement of the rail sections 34 and 36 with respect to each other will be described hereinafter in detail.

Upon operation of the motor 166 in a suitable direction so as to operate each of the drive units 170 to in turn shift the screw shafts 174 downwardly of the body, the links 178 and 180 will be folded with respect to each other to swing the rear rail sections 36 rearwardly and downwardly of the body about the pivots 162. As the rail sections 36 swing rearwardly and downwardly of the body, the rail sections 34 will swing generally outwardly with respect to the rail sections 36 about pivots 76 so as to fold each of the rails 32. The links 58 will generally swing outwardly of the rail sections 34 about their pivots 60 as can be seen in FIGURE 11 so as to allow the rail sections 34 to swing inwardly with respect to the front or No. 1 bow 54. Likewise, as the rail sections 36 swing rearwardly and downwardly of the body, the top fabric will cause the bow supports 190 and bow 202 to swing generally rearwardly and downwardly of the body, as the rail sections 36 swing inwardly of the body from underneath the bow supports 190 as can be seen in FIGURE 11. Thereafter, upon continued folding movement of the top, the top will move to a folded position, as shown in FIGURE 6, within the top well 151. Generally, the rail sections 34 and 36 will be stored above the bows 186 and 202, and the bow 54 will be stored below rail sections 34 and forwardly of the bows 186 and 202.

The operation of the means controlling the folding movement of the rail sections 34 and 36 with respect to each other will now be described with reference to FIGURES 8 thru 10 of the drawings. As shown in FIGURES 8 and 9, when the top is in a raised position, the toothed end 96 of pawl 94 is located out of engagement with the teeth of the ratchet 90 adjacent one end 206 thereof, with the spring 104 engaging one side of the shoulder 112 of the pawl in order to releasably hold the pawl in this position. Upon inboard folding movement of the rail sections 34 and 36 with respect to each other, the end 96 of pawl 94 will engage and move along the teeth of the ratchet 90 in a step-by-step relationship. The toothed ends 96 of pawl 94 will allow the rail sections of each rail to fold inwardly of the body with respect to each other about the pivots 76, but will prevent any reverse folding movement of the rail sections with respect to each other. When the top reaches a lowered position within the top well, lever 102 will come into engagement with the ear 130 of stop 126 to rotate the lever and pawl generally clockwise as viewed in FIGURES 8 and 9 so that the shoulder 112 of the pawl will cam past the shoulder 110 of spring 104 whereby the shoulder of the spring will now engage the opposite side of the shoulder 112 than the side shown in FIGURE 9, and the toothed end 98 of the pawl will be in a position adjacent the other end 208 of the ratchet 90 so as to move along the teeth of the ratchet 90 in a step-by-step relationship when the top is thereafter raised. Thus, each of the ratchets 90 and pawls 94 allow a step-by-step folding movement of the rail sections 34 and 36 of each of the rails with respect to each other to ensure that rails 32 fold synchronously and in unison with respect to each other. Since the pawls 94 move out of engagement with the ratchets at the end of each cycle of movement of the top, the pawls and ratchets are automatically synchronized with respect to each other at the end of each cycle preparatory to start of the next cycle of movement of the top from a raised position to a lowered position or from a lowered position to a raised position. Thus, the pawls and ratchets ensure that the rails 32 fold synchronously and in unison with respect to each other.

If, at any time, the operator desires to reverse the movement of the top, he merely pushes each of the levers 114 so as to move the levers 102 and reverse the pawls 94 with respect to ratchets 90. Thus, the operator has complete control of the folding movement of the top at all times.

Figure 12:
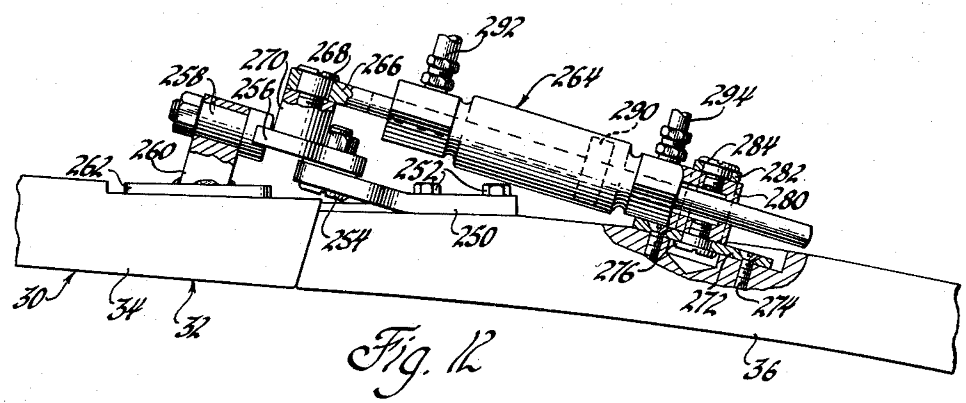
FIGURE 12 is a partially broken away side elevational view of an alternate means for controlling the folding movement of the rail sections of each rail with respect to each other.
Figure 13:
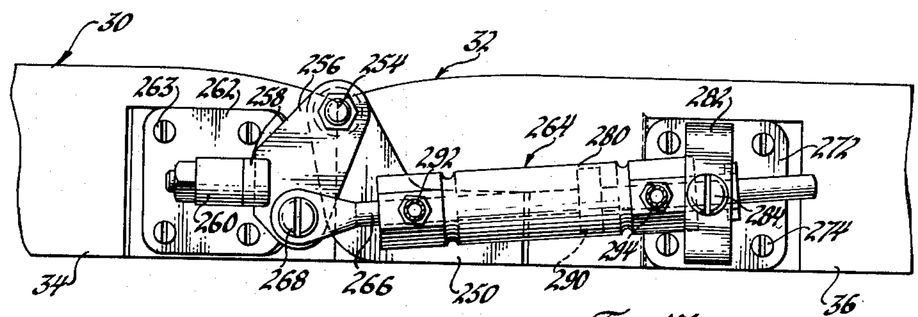
FIGURE 13 is a top plan view of the means of FIGURE 12.
Figure 14:
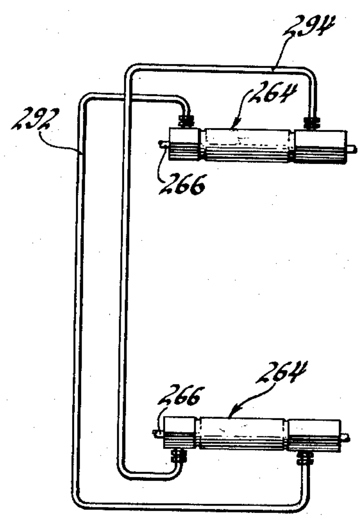
FIGURE 14 is a schematic view showing the manner in which the controlling means of FIGURE 12 for each rail are interconnected.

Referring now particularly to FIGURES 12 through 14 of the drawings, an alternate means for controlling the folding movement of the rail sections 34 and 36 with respect to each other will be described. A mounting bracket 250 is bolted at 252 to the rail section 36 and includes an offset apertured end which is pivotally secured by a bearing stud 254 to a mounting bracket 256. Bracket 256 is fixedly secured to a bearing stud 258 which is rotatably received within an apertured lug 260 secured to a plate 262. Plate 262 is bolted at 263 to the front rail section 34. The brackets 250 and 256 and the bearing studs 254 and 258 pivotally interconnect the rail sections 34 and 36 in the same manner as arms 70 and 78 and bearing studs 76 and 80.

A hydraulic piston and cylinder unit 264 of known type has the piston rod 266 thereof pivotally secured at 268 to a threaded lug 270 which is fixed to the mounting bracket 256. A mounting plate 272 is bolted at 274 to the rear rail section 36 and is pivotally secured at 276 to the cylinder 280 of unit 264.

A U-shaped bracket 282 has its legs bearing on plate 272 and is pivoted at 284 to cylinder 280 generally opposite to the pivot 276. The piston 290 of unit 264 is indicated schematically in FIGURES 12 and 13 and it will be noted that hydraulic lines 292 and 294 interconnect the cylinders 280 of units 264 to opposite sides of the pistons 290. Line 292 interconnects the cylinder of one unit, forwardly of the piston 290 thereof, with the cylinder of the other unit, rearwardly of the piston 290 thereof. Likewise line 294 interconnects the cylinder of the one unit, to the rear side of the piston 290 thereof with the cylinder of the other unit, to the forward side of the piston 290 thereof whereby the units 264 are interconnected in a slave arrangement so as to function in the same manner as the ratchet and pawl units previously described.

Thus, this invention provides a new and improved convertible top of the general type having inwardly folding side rails.

We claim:

1. In combination with an automobile body, a convertible top movable between raised and lowered positions comprising, a pair of spaced foldable side rails, each rail including front and rear rail sections movable between folded and extended positions, means pivotally interconnecting the sections of each rail for movement of said rail sections relative to each other between said positions, means on said body defining a pair of converging axes, means swingably mounting each of said rear rail sections on a respective axis for folding each of said rails upon pivotal movement of said rear rail sections about said axes, means concurrently swinging each of said rear rail sections about a respective axis, and control means mounted on each of said rails adjacent said pivotal interconnecting means and operatively interconnecting the rail sections of each pair of rails, said control means being operative upon movement of said rear rail sections about said axes to concurrently fold the front rear rail sections of each rail with respect to the rear rail sections thereof whereby said rails fold concurrently and in unison with respect to each other.

2. In combination with an automobile body, a convertible top movable between raised and lowered positions comprising, a pair of spaced foldable side rails, each rail including front and rear rail sections movable between folded and extended positions, means pivotally interconnecting the sections of each rail for movement of said rail sections relative to each other between said positions, means on said body defining a pair of converging axes, means swingably mounting each of said rear rail sections on a respective axis for unfolding each of said rails upon pivotal movement of said rear rail sections about said axes, means concurrently swinging each of said rear rail sections about a respective axis, and control means mounted on each of said rails adjacent said pivotal interconnecting means and operatively interconnecting the rail sections of each pair of rails, said control means being operative upon movement of said rear rail sections about said axes to concurrently unfold the front rail sections of each rail with respect to the rear rail sections thereof whereby said rails unfold concurrently and in unison with respect to each other.

3. In combination with an automobile body, a convertible top movable between raised and lowered positions comprising, a pair of spaced foldable side rails, each rail including front and rear rail sections movable between folded and extended positions, means pivotally interconnecting the sections of each rail for movement of said rail sections relative to each other between said positions, means on said body defining a pair of converging axes, means swingably mounting each of said rear rail sections on a respective axis for folding each of said rails upon pivotal movement of said rear rail sections about said axes, means concurrently swinging each of said rear rail sections about a respective axis, control means mounted on each of said rails adjacent said pivotal interconnecting means and operatively interconnecting the rail sections of each pair of rails, said control means being operative upon movement of said rear rail sections about said axes to concurrently permit folding movement and prevent unfolding movement of the front rail sections of each rail with respect to the rear rail sections thereof whereby said rails fold concurrently and in unison with respect to each other, and means synchronizing said control means in the raised position of said top prior to movement of said rear rail sections about said axes.

4. In combination with an automobile body, a convertible top movable between raised and lowered positions comprising, a pair of spaced foldable side rails, each rail including front and rear rail sections movable between folded and extended positions, means pivotally interconnecting the sections of each rail for movement of said rail sections relative to each other between said positions, means on said body defining a pair of converging axes, means swingably mounting each of said rear rail sections on a respective axis for pivotal movement of said rear rail sections about said axes, means concurrently swinging each of said rear rail sections about a respective axis, and control means mounted on each of said rails adjacent said pivotal interconnecting means and operatively interconnecting the rail sections of each pair of rails, said control means being operative upon movement of said rear rail sections about said axes to selectively and alternately permit folding or unfolding pivotal movement of the front rail sections of each rail with respect to the rear rail sections thereof concurrently with swinging movement of the rear rail sections about said axes whereby said rails fold and unfold concurrently and in unison with respect to each other.

5. In combination with an automobile body, a convertible top movable between raised and lowered positions comprising, a pair of spaced foldable side rails, each rail including front and rear rail sections movable between folded and unfolded extended positions, means pivotally interconnecting the sections of each rail for movement of said rail sections relative to each other between said positions, means on said body defining a pair of converging axes, means swingably mounting each of said rear rail sections on a respective axis for pivotal movement of said rear rail sections about said axes, means concurrently swinging each of said rear rail sections about a respective axis, control means mounted on each of said rails adjacent said pivotal interconnecting means and operatively interconnecting the rail sections of each pair of rails, said control means being operative upon movement of said rear rail sections about said axes to control the pivotal movement of the front rail sections of each rail with respect to the rear rail sections thereof concurrently with pivotal movement of said rear rail sections about said axes whereby said rails fold and unfold concurrently and in unison with respect to each other, and means controlling the operation of said control means.

6. In combination with an automobile body, a convertible top movable between raised and lowered positions comprising, a pair of spaced foldable side rails, each rail including front and rear rail sections movable between folded and extended positions, means pivotally interconnecting the sections of each rail for movement of said rail sections relative to each other between said positions, means on said body defining a pair of converging axes, means swingably mounting each of said rear rail sections on a respective axis for folding each of said rails upon pivotal movement of said rear rail sections about said axes, means concurrently swinging each of said rear rail sections about a respective axis, control means mounted on each of said rails adjacent said pivotal interconnecting means and operatively interconnecting the rail sections of each pair of rails, said control means being operative upon movement of said rear rail sections about said axes to selectively and alternately permit folding movement and prevent unfolding movement or prevent folding movement and permit unfolding movement of the front rail sections of each rail with respect to the rear rail sections thereof concurrently with swinging movement of said rear rail sections about said axes whereby said rails fold or unfold concurrently and in unison with respect to each other, first means operative in the raised and lowered positions of said top to respectively operate said control means to permit folding movement and prevent unfolding movement or prevent folding movement and permit unfolding movement of the front rail sections with respect to the rear rail sections, and second means operative in any position of said top to respectively operate said control means to permit folding movement and prevent unfolding movement or prevent folding movement and permit unfolding movement of the front rail sections with respect to the rear rail sections.

7. In combination with an automobile body, a convertible top movable between raised and lowered positions comprising, a pair of spaced foldable side rails, each rail including front and rear rail sections movable between folded and unfolded extended positions, means pivotally interconnecting the sections of each rail for movement of said rail sections relative to each other between said positions, means on said body defining a pair of converging axes, means swingably mounting each of said rear rail sections on a respective axis for pivotal movement of said rear rail sections about said axes, means concurrently swinging each of said rear rail sections about a respective axis, and control means including reversible ratchet and pawl means mounted on each of said rails adjacent said pivotal interconnecting means and operatively interconnecting the rail sections of each pair of rails, said control means being operative upon movement of said rear rail sections about said axes to control the pivotal movement of the front rail sections of each rail with respect to the rear rail sections thereof concurrently with swinging movement of the rear rail sections about said axes whereby said rails fold and unfold concurrently and in unison with respect to each other.

8. In combination with an automobile body, a convertible top movable between raised and lowered positions comprising, a pair of spaced foldable side rails, each rail including front and rear rail sections movable between folded and unfolded extended positions, means pivotally interconnecting the sections of each rail for movement of said rail sections relative to each other between said positions, means on said body defining a pair of converging axes, means swingably mounting each of said rear rail sections on a respective axis for pivotal movement of said rear rail sections about said axes, means concurrently swinging each of said rear rail sections about a respective axis, a top bow, spaced bow support means secured to said bow, means mounting said support means on said body for movement in generally vertical planes extending longitudinally of said body, said support means engaging said rear rail sections in the raised position of said top and being movable rearwardly of said body upon movement of said rear rail sections about said axes to fold said rails, and control means mounted on each of said rails adjacent said pivotal interconnecting means and operatively interconnecting the rail sections of each pair of rails, said control means being operative upon movement of said rear rail sections about said axes to control the pivotal movement of the front rail sections of each rail with respect to the rear rail sections thereof concurrently with swinging movement of the rear rail sections about said axes whereby said rails fold and unfold concurrently and in unison with respect to each other.

References Cited in the file of this patent

UNITED STATES PATENTS

| | | |
|---|---|---|
| 2,768,857 | Albrecht | Oct. 30, 1956 |
| 2,860,913 | Kuiper et al. | Nov. 18, 1958 |

FOREIGN PATENTS

| | | |
|---|---|---|
| 413,467 | Great Britain | July 19, 1934 |